US012718034B2

(12) United States Patent
Meng et al.

(10) Patent No.: US 12,718,034 B2
(45) Date of Patent: Aug. 25, 2026

(54) TRANSFORMING NATURAL LANGUAGE REQUIREMENTS FOR AEROSPACE SYSTEMS TO FORMALISM USING LARGE LANGUAGE MODELS

(71) Applicant: General Electric Company, Evendale, OH (US)

(72) Inventors: Baoluo Meng, Frisco, TX (US); Robert Lorch, Iowa City, IA (US); Kit Siu, Saratoga Springs, NY (US); Michael R. Durling, Saratoga Springs, NY (US); Abha Moitra, Lexington, MA (US); Sarat Chandra Varanasi, Schenectady, NY (US); Saswata Paul, Watervliet, NY (US)

(73) Assignee: General Electric Company, Evendale, OH (US)

( * ) Notice: Subject to any disclaimer, the term of this patent is extended or adjusted under 35 U.S.C. 154(b) by 61 days.

(21) Appl. No.: 18/924,064

(22) Filed: Oct. 23, 2024

(65) Prior Publication Data

US 2026/0111687 A1 Apr. 23, 2026

(51) Int. Cl.

| | |
|---|---|
| ***G06F 40/58*** | (2020.01) |
| ***B64C 25/00*** | (2006.01) |
| ***G06F 40/166*** | (2020.01) |
| ***G06F 40/211*** | (2020.01) |
| ***G06F 40/289*** | (2020.01) |
| ***G06F 40/30*** | (2020.01) |

(52) U.S. Cl.

CPC ............ *G06F 40/58* (2020.01); *B64C 25/001* (2013.01); *G06F 40/166* (2020.01); *G06F 40/211* (2020.01); *G06F 40/289* (2020.01); *G06F 40/30* (2020.01)

(58) Field of Classification Search

CPC ...... G06F 40/58; G06F 40/166; G06F 40/211; G06F 40/289; G06F 40/30; B64C 25/001

USPC ........................................................ 701/16

See application file for complete search history.

(56) References Cited

PUBLICATIONS

Extended European Search Report issued in corresponding application EP 25194874.1 dated Feb. 5, 2026.

Gomez Alejandro Pradas et al., "Large language models in complex system design", Proceedings of the Design Society, vol. 4, May 16, 2024 (May 16, 2024), pp. 2197-2206.

(Continued)

*Primary Examiner* — Maceeh Anwari

(74) *Attorney, Agent, or Firm* — Carter, DeLuca & Farrell LLP

(57) ABSTRACT

A system for using large language models (LLMs) to convert natural language (NL) requirements for aerospace systems to formalism for controlling a landing gear system of an aircraft includes a processor and a memory including instructions which, when executed by the processor, causes the system at least to perform using an LLM to revise a received NL expression associated with a requirement for an aerospace system. An LLM is also used to replace at least one word in the revised NL expression with a lifted atomic entity to generate an underlying sentence structure and translate the underlying sentence structure to a lifted logical formula. An LLM is also used to ground the lifted logical formula and to convert the NL expression into a formalized requirement for the aerospace system. The system also controls the aerospace system based on the formalized requirement.

19 Claims, 5 Drawing Sheets

(56) References Cited

PUBLICATIONS

Tikayat Ray Archana et al., "Agile Methodology for the Standardization of Engineering Requirements Using Large Language Models", Systems, vol. 11, Jul. 1, 2023 (Jul. 1, 2023), pp. 1-28.
Zrelli Rim et al., "Advancing Formal Verification: Fine-Tuning LLMs for Translating Natural Language Requirements to CTL Specifications", 2024 International Workshop on Rapid System Prototyping (RSP), IEEE, Oct. 3, 2024 (Oct. 3, 2024), pp. 21-27.
Yongchao Chen, Rujul Gandhi, Yang Zhang, and Chuchu Fan, "NI2tl: Transforming natural languages to temporal logics using large language models", arXiv preprint arXiv:2305.07766, 204.
Matthias Cosler, Christopher Hahn, Daniel Mendoza, Frederik Schmitt, and Caroline Trippel, "nl2spec: Interactively translating unstructured natural language to temporal logics with large language models", arXiv preprint arXiv:2303.04864, 2023.
Andrew Crapo and Abha Moitra, Toward a unified English-like representation of semantic models, data, and graph patterns for subject matter experts. International Journal of Semantic Computing, 7(03):215-236, 2013.
Andrew Crapo, Abha Moitra, Craig McMillan, and Daniel Russell, "Requirements capture and analysis in ASSERT(tm)", IEEE 25th International Requirements Engineering Conference (RE), pp. 283-291. IEEE, 2017.
Andrew W Crapo and Abha Moitra, "Using OWL ontologies as a domain-specific language for capturing requirements for formal analysis and test case generation", IEEE 13th International Conference on Semantic Computing (ICSC), pp. 361-366. IEEE, 2019.
Francesco Fuggitti and Tathagata Chakraborti, "NI2Itl—a python package for converting natural language (nl) instructions to linear temporal logic (LTL) formulas", In AAAI Conference on Artificial Intelligence, 2023.
Jie He, Ezio Bartocci, Dejan Nickovic, Haris Isakovic, and Radu Grosu, "DeepSTL: from English Requirements to Signal Temporal Logic", In Proceedings of the 44th International Conference on Software Engineering, pp. 610-622, 2022.
Meng Li, Baoluo Meng, Han Yu, Kit Siu, Michael Durling, Daniel Russell, Craig McMillan, Matthew Smith, Mark Stephens, and Scott Thomson, "Requirements based automated test generation for safety critical software", 2019 IEEE/AIAA 38th Digital Avionics Systems Conference (DASC), pp. 1-10. IEEE, 2019.
Jason Xinyu Liu, Ziyi Yang, Benjamin Schornstein, Sam Liang, Ifrah Idrees, Stefanie Tellex, and Ankit Shah, "Lang2tl: Translating natural language commands to temporal specification with large language models", 6th Conference on Robot Learning (CoRL 2022), pp. 1-8.
Abha Moitra, Kit Siu, Andrew W Crapo, Michael Durling, Meng Li, Panagiotis Manolios, Michael Meiners, and Craig McMillan, "Automating requirements analysis and test case generation", Requirements Engineering, 24:341-364, 2019.
Abhiramon Rajasekharan, Yankai Zeng, Parth Padalkar, and Gopal Gupta, "Reliable natural language understanding with large language models and answer set programming", arXiv preprint arXiv:2302.03780, Reliable NLU, pp. 274-287 (2023.
Nils Reimers and Iryna Gurevych, "Sentence-BERT: Sentence Embeddings using Siamese BERT-Networks", In Proceedings of the 2019 Conference on Empirical Methods in Natural Language Processing. Association for Computational Linguistics, Nov. 2019.
Kit Siu, Abha Moitra, Michael Durling, Andy Crapo, Meng Li, Han Yu, Heber Herencia-Zapana, Mauricio Castillo-Effen, Shiraj Sen, Craig McMillan, Daniel Russell, Sundeep Roy, "Flight Critical Software and Systems Development Using Assert", IEEE/AIAA 36th Digital Avionics Systems Conference (DASC), pp. 1-10. IEEE, 2017.
Hugo Touvron, Louis Martin, Kevin Stone, Peter Albert, Amjad Almahairi, Yasmine Babaei, Nikolay Bashlykov, Soumya Batra, Prajjwal Bhargava, Shruti Bhosale, et al., "L1 ama 2: Open Foundation and Fine-Tuned Chat Models", arXiv preprint arXiv:2307.09288, 2023.
Yuan Yang, Siheng Xiong, Ali Payani, Ehsan Shareghi, and Faramarz Fekri, "Harnessing the Power of Large Language Models for Natural Language to First-Order Logic Translation", arXiv preprint arXiv:2305.15541, 2023.

TRANSFORMING NATURAL LANGUAGE REQUIREMENTS FOR AEROSPACE SYSTEMS TO FORMALISM USING LARGE LANGUAGE MODELS

STATEMENT OF GOVERNMENT SUPPORT

The subject matter of this disclosure was made with U.S. government support under contract number FA8750-20-C-0203 awarded by the Defense Advanced Research Projects Agency. The U.S. government has certain rights in the subject matter of this disclosure.

TECHNICAL FIELD

The present disclosure relates generally to transforming natural language (NL) requirements to formalism and, more particularly, to systems and methods of automatically translating NL requirements for aerospace systems to formalism by leveraging large language models (LLMs) in a controlled manner to mitigate LLM hallucinations and ensure the accuracy of formalized requirements.

BACKGROUND

Formalism employs mathematical models, precise notations, and logical reasoning. It is useful across a wide range of disciplines and applications where a precise and rigorous representation of systems and concepts is essential. However, creating formalism often requires a deep understanding of formal methods, making it inaccessible to individuals without specialized training. The complexity of formalism also makes it time-consuming and costly to develop, thus acting as a barrier for practitioners seeking to apply formalism in their respective domains.

In the aerospace industry, safety and reliability are paramount. Writing clear and detailed requirements can capture potential risks and issues early in the development process, which reduces the likelihood of encountering problems in fielded systems, where addressing issues can be more challenging and costly. However, engineers may prefer writing NL requirements, which often leads to wordiness and ambiguity, necessitating careful perusal for error identification. Such manual examination can be costly and time-consuming. Formalizing requirements can alleviate such problems by enabling auto-analysis of the requirements. To make formalism more accessible to non-expert requirement engineers, a need exists for a process that translates unstructured NL requirements to formalism.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
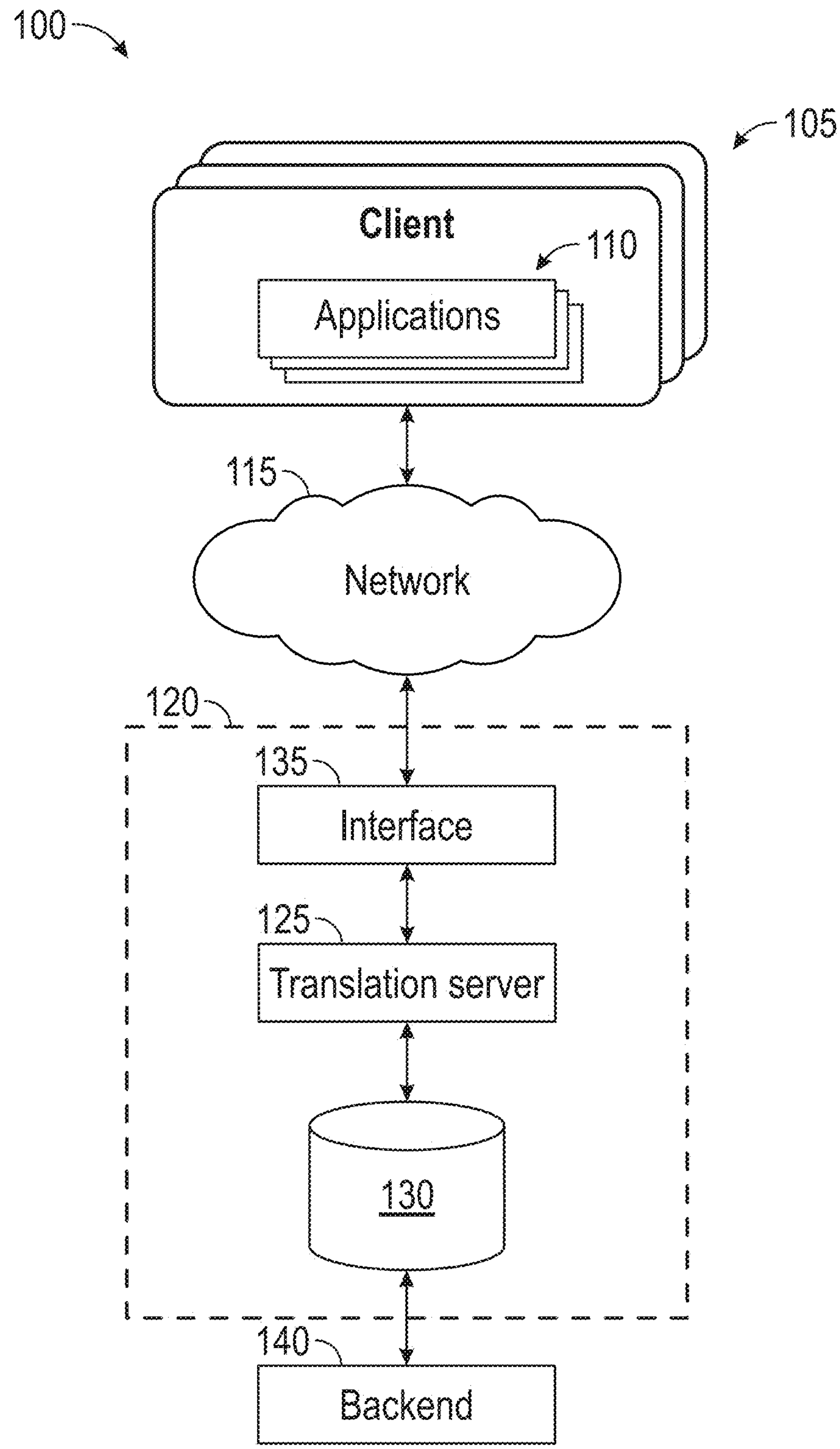
FIG. 1 is an example block diagram of a system, in accordance with aspects of the present disclosure.

Although this disclosure will be described in terms of specific aspects, it will be readily apparent to those skilled in this art that various modifications, rearrangements, and substitutions may be made without departing from the spirit of this disclosure.

For the purpose of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the features illustrated herein, and any additional applications of the principles of this disclosure, as illustrated herein, which would occur to one skilled in the relevant art and having possession of this disclosure, are to be considered within the scope of this disclosure.

Formalism, as a practice that emphasizes the use of rigorous mathematical models and precise notations, is useful across a wide range of disciplines and applications. In software and systems engineering, formalism and its accompanying formal analysis techniques can assist in early error detection, identifying flaws and inconsistency in the development lifecycle, which significantly reduces costs. Formalism enables rigorous verification and validation of systems, ensuring that they meet their intended requirements and behave as expected. However, formal analysis requires a formal representation of the system being analyzed, which is a barrier to entities that do not employ experts in formal methods. To make formalism more approachable, the present disclosure provides a large language model (LLM)-based approach to interactively translate unstructured natural language to formalism. The LLM-based approach of the present disclosure employs a usable, purely natural language-based interface that provides high assurance for translation correctness while still being approachable for non-experts in formal methods. More specifically, the present disclosure provides a process that splits the translation task into several blocks, including preprocessing for wordiness and ambiguity, entity recognition, syntactic abstraction, grounding, translation to an abstract syntax tree (AST), and reverse translation. The effectiveness of this approach may be demonstrated, as detailed below, based on an experimental evaluation of a common aerospace industry use case, requirements engineering. Requirements engineering is an early phase of system development where system requirements are elicited, captured, and analyzed for defects.

NL may be difficult to formalize because it often carries ambiguity and because there are often several ways to express the same idea. Additionally, LLMs present many challenges: (i) they are prone to "hallucinating" incorrect information; (ii) they require a lot of computing resources; (iii) they often have license or data privacy issues relevant to corporate users (if using an externally-hosted LLM); and (iv) they require a lot of training data to fine-tune for specific tasks.

The process of the present disclosure splits the translation task into several blocks. Aspects of the process include syntactic abstraction, translation, and grounding, where the LLM performs the translation block on a lifted version of the sentence that preserves the underlying sentence structure while abstracting away unnecessary details. Lifting is a technique used to abstract concrete entities from sentences by replacing these concrete entities with symbols. This abstraction helps with translation of such sentences in subsequent processes. To supplement the above-noted aspects of the process of the present disclosure, two preprocessing blocks are included: (i) identifying wordiness and ambiguity and (ii) sentence structure recognition. Block (i) helps state the sentence as clearly and concisely as possible without changing its intended semantics, while block (ii) prepares the sentence for syntactic abstraction. Also, two postprocessing blocks are included: (iii) translation to an AST and rule-based NL representation (iv) LLM reverse-translation. Block (iii) will detect if the LLM's output is ill-formed, and translate the AST to a rule-based NL representation for engineers to review the correctness of its translation while block (iv) involves translating formalism back to natural language. Blocks (iii) and (iv) are combined to mitigate potential hallucinations generated by LLMs, ensuring the correctness of the LLM output. All blocks of translation may be performed using in-context learning and/or fine-tuned LLMs, where in-context learning may not require a large training data set as is the case with fine-tuned LLMs. In general, the approach of the present disclosure avoids excessive manual effort (as in reinforcement learning with human feedback or manual dataset generation), and provides an approach that generalizes across domains.

Requirements engineering is an early stage of the system development phase where system requirements are elicited, captured, and analyzed. A common problem is that defects in requirements (e.g. logical inconsistencies between requirements, missing requirements, redundancies, etc.) are not caught until later in system development, and these design errors are expensive and time-consuming to fix retroactively. One way to rigorously analyze requirements is to state them formally and use formal methods tools for requirements analysis, but this is difficult, as previously discussed. The aerospace industry relies on the capture of correct and complete requirements that can also be formally analyzed. Precisely formalizing requirements into a logical form by using the requirements' intent expressed in NL is a non-trivial and time-consuming process and relies on the requirements engineer in the aerospace application domain in addition to expertise in formal methods.

The approach of the present disclosure can be utilized to interactively formalize a set of requirements as a prerequisite to comprehensive formal analysis. Next, some relevant concepts necessary to understand the translation process of the present disclosure are introduced: "In-context learning" involves feeding a task description, instructions, and examples as part of an LLM's input in order to increase the LLM's capability of completing the specified task. Feeding examples is also referred to as "few-shot learning". It is a specific method of prompt engineering. "Fine-tuning" involves performing additional training on the model with a task-specific dataset (input and output pairs). "Priming" involves giving an LLM a textual description of initial relevant context and knowledge before querying a specific task. "Syntactic abstraction" involves replacing details of a sentence with atomic entities, leaving only the underlying sentence structure. The resulting abstracted sentence is called a "lifted sentence". After translating lifted sentences to lifted logical formulas, the logical formulas are "grounded" by reintroducing the details that were originally abstracted and tying them to a glossary of core concepts. In the context of an LLM, grounding refers to the process of anchoring the responses of the LLM in real-world knowledge (e.g., knowledge of the aerospace domain) and ensuring the responses maintain relevance to the context. This is achieved by integrating the LLM with external data sources, continuous learning mechanisms, and domain-specific (e.g., aerospace) insights. The grounding process ensures that any two references to the same core concept are mapped to the same atomic entities. The formalisms considered in the present disclosure are, generally speaking, extensions and fragments of "first-order logic" and "temporal logic". First-order logic (FOL) refers to logic in which the predicate of a sentence or statement can only refer to a single subject (e.g., "All birds fly."). Temporal logic (TL) is a modal logic with modalities referring to time. In TL, one can encode formulae about the temporal future of paths, e.g., a condition will eventually be true, a condition will be true until another fact becomes true, etc.

Prior approaches to translation of natural language to formal logic and where the present disclosure is situated with respect to these prior approaches will now be discussed. One prior approach illustrates the core idea of using formal methods to assist LLMs with complicated reasoning tasks such as question and answering in the restaurant ordering domain. However, this approach is based on answer set programming (ASP), a fundamentally different formalism and has been used to check the output of LLMs for high-level Natural Language Understanding tasks. ASP is a logic and rule-based formalism for performing knowledge representation and reasoning tasks that can model commonsense knowledge and perform reasoning. In comparison, the approach of the present disclosure generates formal specifications in First-order Temporal Logics from LLMs, which is a superset of logic used in ASP. Another prior approach introduces the idea to algorithmically generate training data based on a grammar, where the grammar is informed by a study of real-world signal temporal logic specification data. However, this approach requires a data analysis for the target formalism (which, of course, also assumes such data exists in the first place). The model might also perform poorly for test data outside of the grammar. Yet another prior approach employs a combination of lifting and fine-tuning using a generated dataset. The dataset is generated by prompting an LLM for NL-TL (temporal logic) pairs and then correcting them using reinforcement learning with human feedback. The present disclosure avoids such manual effort. Still yet another prior approach uses a process going from (i) boilerplate pattern to (ii) LLM translation to (iii) postprocessing. The boilerplate input restriction allows naive translation to be fairly accurate. The approach of the present disclosure does not impose such restrictions on input, which frees the user from manually providing such input.

Another prior approach proposes two main approaches. In the first main approach, a fine-tuning dataset is generated using GPT-4, where the validity of the logical formulas (with respect to the NL text) is verified heuristically. The data is used to fine-tune an LLM for direct translation. In the second main approach, a (relatively small) LLM corrects output from a naive GPT translation, trained using reinforcement learning with human feedback. The present disclosure avoids such manual work. In yet another prior approach, interactive translation is the focus, however, the interactivity is through translations of sub-formulas which are more readable than the whole formula, which differs from the approach of the present disclosure which provides a purely natural language interface with the user.

FIG. 1 is an illustrative block diagram of a system 100 according to an aspect of the present disclosure. It should be understood, however, that systems employing the concepts for formalizing requirements of the present disclosure are not limited to the particular system 100 shown in FIG. 1. System 100 includes one or more client devices 105 running one or more applications 110. Applications 110 may include different software applications that support the operations and process of an organization. In some embodiments, one of the applications 110 may include, at least in part, a framework or process (e.g., framework or process 200 shown in FIG. 2) that assists a user in interactively translating unstructured natural language requirements to formalism. In some aspects, unstructured natural language might be expressed in English. However, the present disclosure is not limited to providing translations for English-based natural language. In some embodiments, applications 110 may be configured to facilitate, support, and execute a program to generate a translation of unstructured natural language requirements to formalism in a cloud computing platform 120.

The cloud computing platform 120 may include an interface gateway 135 to facilitate, enable, and support communication between client devices 105 and a translation server 125. The client devices 105 may execute a browser that is used by a user to interface with cloud computing platform 120 via network 115.

Translation server 125 may be associated with a storage device 130 such as, but not limited to, a storage area network. In some aspects of the present disclosure, cloud computing platform 120 may include more than one instance of a server such as translation server 125 and more than one data storage device 130. Storage device 130 may include query-responsive data source or sources that are or become known, including but not limited to a relational database management system. Data stored in the storage device 130 may be stored as part of a relational database, a multi-dimensional database, an Extensible Markup Language (XML) document, or any other data storage system storing structured and/or unstructured data. The data may be distributed among several relational databases, multi-dimensional databases, and/or other data sources. In some embodiments, storage device 130 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources. Translation server 125 may include a computing device that processes requests using a computer processor.

System 100 further includes a backend system 140 that can generate, automatically, in response to a request or call from cloud computing platform 120, executable code or instructions to perform a process to translate and/or support the translation of unstructured natural language requirements. In some aspects herein, a user may provide an indication or request for one or more NL requirement translations, as implemented in an application 110 and/or cloud computing platform 120 via network 115, which may operate in cooperation with the processing of backend system 140 to generate a response to effectuate the translation of a NL requirement input.

In one example, client device 105 executes an application 110 to generate a translation of a NL requirement input via a user interface (UI) to a user on a display of client device 105. The user may manipulate UI elements within the UI, via touchscreen, keyboard, or audio entries, to indicate and specify a requirement in an unstructured NL format to be automatically translated into formalism, where the cloud computing platform 120, in cooperation with storage device 130 and possibly backend system 140, generate the translation using, for example, the framework or process 200 depicted in FIG. 2.

Figure 2:
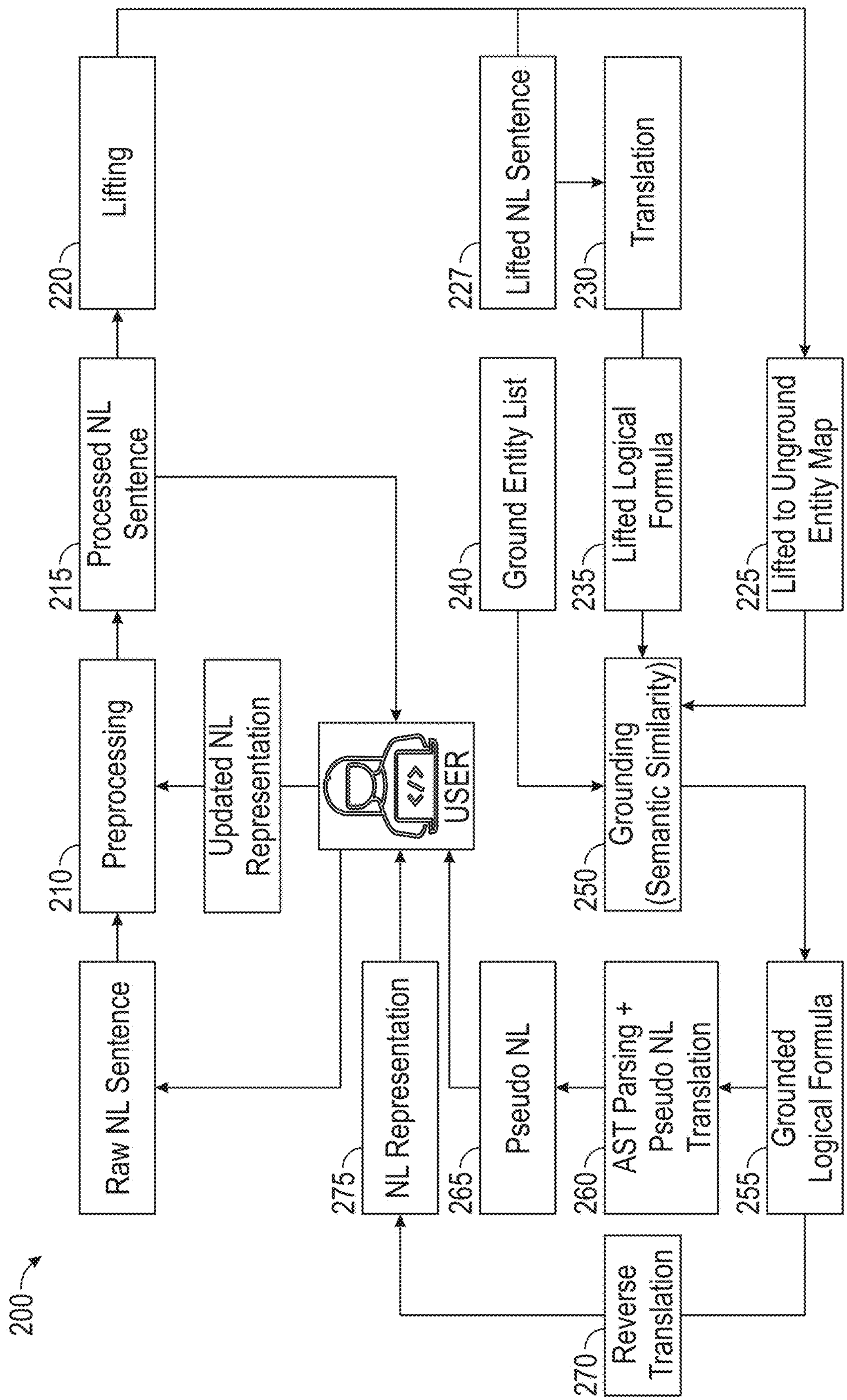
FIG. 2 shows a natural language requirement transformation process, in accordance with aspects of the present disclosure.

FIG. 2 is an illustrative depiction of a framework or process 200 for transforming unstructured NL requirements to formalism using a LLM (e.g., ChatGPT, Llama, Mistral, fine-tuned LLMs, etc.). Process 200 of the present disclosure includes three general stages, preprocessing, core translation, and postprocessing. The preprocessing stage is comprised solely of block 210. In block 210, the LLM takes in an NL requirement (e.g., in the form of a raw NL sentence) and interactively produces a clear, concise NL representation via conversation with a user. This leverages the LLM's chatbot functionality, as the user can ask questions about the LLM's output and provide user feedback. The LLM may be primed to maximize performance, for example, by using the following prompt:

Question: Pretend that you are a formal methods expert advising an engineer on how to state a system specification concisely and unambiguously. Be sure to omit wordiness and unnecessary details that are not relevant to the system specification, and be sure to not alter the semantics of the specification. In the following sentence, remove any unnecessary wordiness and alert the engineer of any natural-language ambiguities: <sentence>.

Answer:"

The user then converses with the chatbot until the user is satisfied with a (potentially) revised version of the NL input requirement. Interaction ensures that the semantics of the requirement are unchanged.

Core translation takes place at blocks 220, 230, and 250. Block 220 performs lifting, which can also be thought of as atomic entity recognition. Here, the LLM takes as input the processed NL sentence from block 215 and abstracts away details of the sentence leaving only the underlying sentence structure. Similar to block 210, the input is primed, for example, with a precise description of the task:

Your task is to take English sentences as input and perform syntactic abstraction, producing "lifted" English sentences as output, where some phrases are abstracted away and replaced with atomic entities of the form [Pn abstracted details]. Start with "P1", then "P2", "P3", and so on. Aspects of the input sentence that should be maintained (not abstracted) include conditional statements, conjunctions, disjunctions, negations, equality, comparisons, temporal aspects, and units.

Then, one or more examples are given for in-context learning similar to the following:

Input: If you are born, then eventually you will die.

Output: If [P1\you are born], then eventually [P2\you will die].

In the above example, text of the form [Pn\extra details] means that the extra details are abstracted away and replaced with the atomic entity Pn.

Once sentences are lifted to block 227 where unnecessary details are replaced with atomic entities, translation is performed at block 230 to generate a lifted logical formula at block 235. The priming description may be, for example:

Your task is to translate lifted English sentences to linear temporal logic (LTL). The lifted English sentences have some details abstracted away in terms of atomic entities of the form [Pn], where "n" is some number. In LTL, only use the operators & (and), | (or), ! (not), = (equals), > (greater than), < (less than), Globally, Eventually, Next, Yesterday, Since, and Until. < Description of the semantics of the operators.> The LTL translation should only include these operators and abstraction entities with no extra English verbiage. Each entity in the input should appear somewhere in the output.

Continuing with the earlier example, the LLM is given context as so:

Input: If [P1], then eventually [P2].

Output: [P1]→Eventually [P2].

The translation task is easier for the LLM when operating over lifted sentences with atomic entities rather than full NL sentences with (possibly) complex vocabulary and wordy phrases.

The final aspect of core translation is grounding, performed at block 250. At block 250, the lifted atomic entities of the form Pn are replaced with concrete versions representing real concepts, e.g., "born" and "die". The purpose of grounding is to ensure that multiple references to the same core concept (within or across formulas) are mapped to the same (grounded) atomic entity. For example, consider a situation where two NL sentences "If you are born, then eventually you will die" and "If you died, then once you were born" are translated to formalism. The two NL phrases "you will die" (from the first sentence) and "you died" (from the second sentence) need to be referenced by the same entity "die". To achieve this, phrase embeddings are retrieved from the LLM for (i) each value in the lifted to unground entity map (LUEM) of representation produced at block 225 (which associates each lifted atomic entity to the details that were abstracted away), as well as (ii) each value input from block 240, the ground entity list representing the core concepts of the underlying system. Then, each value from the LUEM map produced at block 225 is associated with the most similar ground entity from block 240 by computing the highest cosine similarity between the associated phrase embeddings. The ground entity list in block 240 can be generated from a project glossary or provided by users manually. A lifted atomic entity is an abstracted element that has been replaced with a symbol. The lifted atomic entity is considered indivisible and cannot be further decomposed into simpler components.

Postprocessing occurs at blocks 260 and 270, and involves performing correctness checks on the grounded logical formula from block 250. First, at block 260, the string representation of the grounded logical formula is parsed into an AST representation. If parsing fails, then the formula is syntactically invalid. Rather than immediately failing, LLM self-correction is performed where the LLM is instructed to review its translation and look for mistakes using, for example, the following prompt:

The following displays a natural language sentence along with a corresponding linear temporal logic (LTL) translation. However, the LTL translation is syntactically ill-formed. Please review the translation and output an updated translation to LTL.

This gives an opportunity to mend the failed translation, rather than completely starting over. Then, in block 270, the process 200 performs reverse translation on the AST representation. This converts the structured formalism back to NL such that the user can determine whether the underlying formalism generated by the process 200 matches the user's intent without the user having to manually process the bare formalism. Block 270 produces a reverse translation of the logical formula generated by LLM, giving a natural and readable translation at block 275. For example, the following instruction may be given:

Translate the following linear temporal logic formula, expressed in a structured representation, to natural language.

However, just using an LLM for reverse translation does not fully validate the underlying formalism, as there is no guarantee that the LLM's reverse translation leaves the semantics unchanged (which is a problem for which the present disclosure provides a solution). With this in mind, also presented at block 260 is a rule-based translation to a pseudo-NL that includes parentheses denoting scope at block 265, which guarantees that the reverse translation semantically matches the underlying formula. For example, for the structured formula:

('IMPLIES', ('AND', ('EQUALS', 'command line', 'normal mode'), ('EQUALS', 'command handle', 'down')), ('NOT', 'retraction sequence')), the LLM reverse translation gives:

If the command line is in normal mode and the command handle is down, then the retraction sequence should not occur.

while the rule-based pseudo-NL translation gives:

(if ((command line is normal mode) and (command handle is down)), then (retraction sequence does not happen)).

Figure 3:
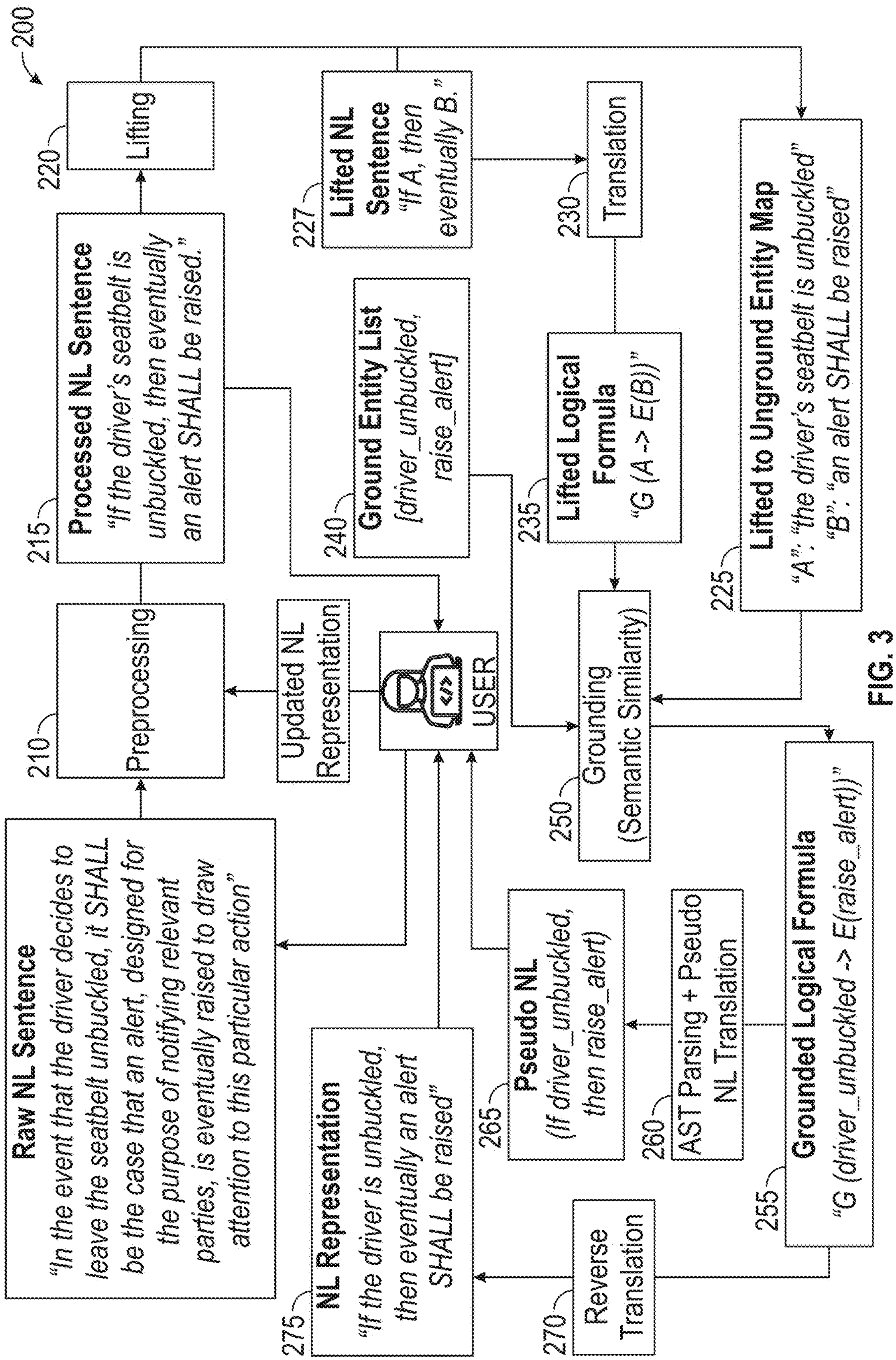
FIG. 3 is one illustrative example of use of the natural language requirement transformation process of FIG. 2, in accordance with an aspect of the present disclosure.

Referring now to FIG. 3, a specific example illustrating the use of process 200 to transform an unstructured NL requirement to formalism is shown. At block 210, for example, the LLM receives, as an input requirement, the following raw NL sentence from a user:

In the event that the driver decides to leave the seatbelt unbuckled, it SHALL be the case that an alert, designed for the purpose of notifying relevant parties, is eventually raised to draw attention to this particular action.

The LLM processes the raw NL sentence input at block 210 to omit wordiness and ambiguity from the raw NL sentence provided by the user and outputs the following sentence at block 215:

If the driver's seatbelt is unbuckled, then eventually an alert SHALL be raised.

The user may be asked by the chatbot if the sentence output at block 215 matches the user's intent. If the output sentence does not match the user's intent, the user may return to the preprocessing stage at block 210 and input a revised NL input requirement that is processed by the LLM to once again remove wordiness and ambiguity. This process may be repeated until the user is satisfied with the revised version of the input NL requirement.

At block 220, lifting is performed where the LLM takes as input the processed NL from block 215 and abstracts away details of the sentence leaving only the underlying sentence structure, which is lifted to an ungrounded entity map at block 225 as follows:

A: 'the driver's seatbelt is unbuckled'

B: 'an alert SHALL be raised'

This, in turn, leaves the following lifted NL sentence at block 227:

If A, then eventually B

Once lifting is performed, where details not necessary at the level of logical formalization are replaced with atomic entities, translation is performed at block 240 on the lifted NL sentence to a lifted logical formula, e.g., "G (A→E (B))" at block 235, where G and E are temporal operators representing "globally" and "eventually". Grounding is performed at block 250 where the lifted atomic entities are replaced with concrete versions representing real concepts to produce a grounded logical formula, e.g., "G (driver_unbuckled→E (raise_alert))".

At blocks 260 and 270, postprocessing occurs where correctness checks are performed on the grounded logical formula from block 250. First at block 260, the string representation of the grounded logical formula is parsed into an AST representation. Next, at block 270, reverse translation is performed on the AST representation. This converts the structured formalism back to NL such that the user can determine when the underlying formalism generated by process 200 matches the user's intent without the user having to manually process the bare formalism. Block 270 produces a reverse translation of the logical formula generated by the LLM, giving a natural and readable translation (e.g., "If the driver is unbuckled, then eventually an alert SHALL be raised") at block 275. However, since using an LLM for reverse translation does not fully validate the underlying formalism, as described above, the rule-based translation at block 270 to a pseudo-NL that includes parentheses denoting scope (e.g., (If driver_unbuckled, then raise_alert)) at block 265 guarantees that the reverse translation semantically matches the underlying formula.

Figure 4:
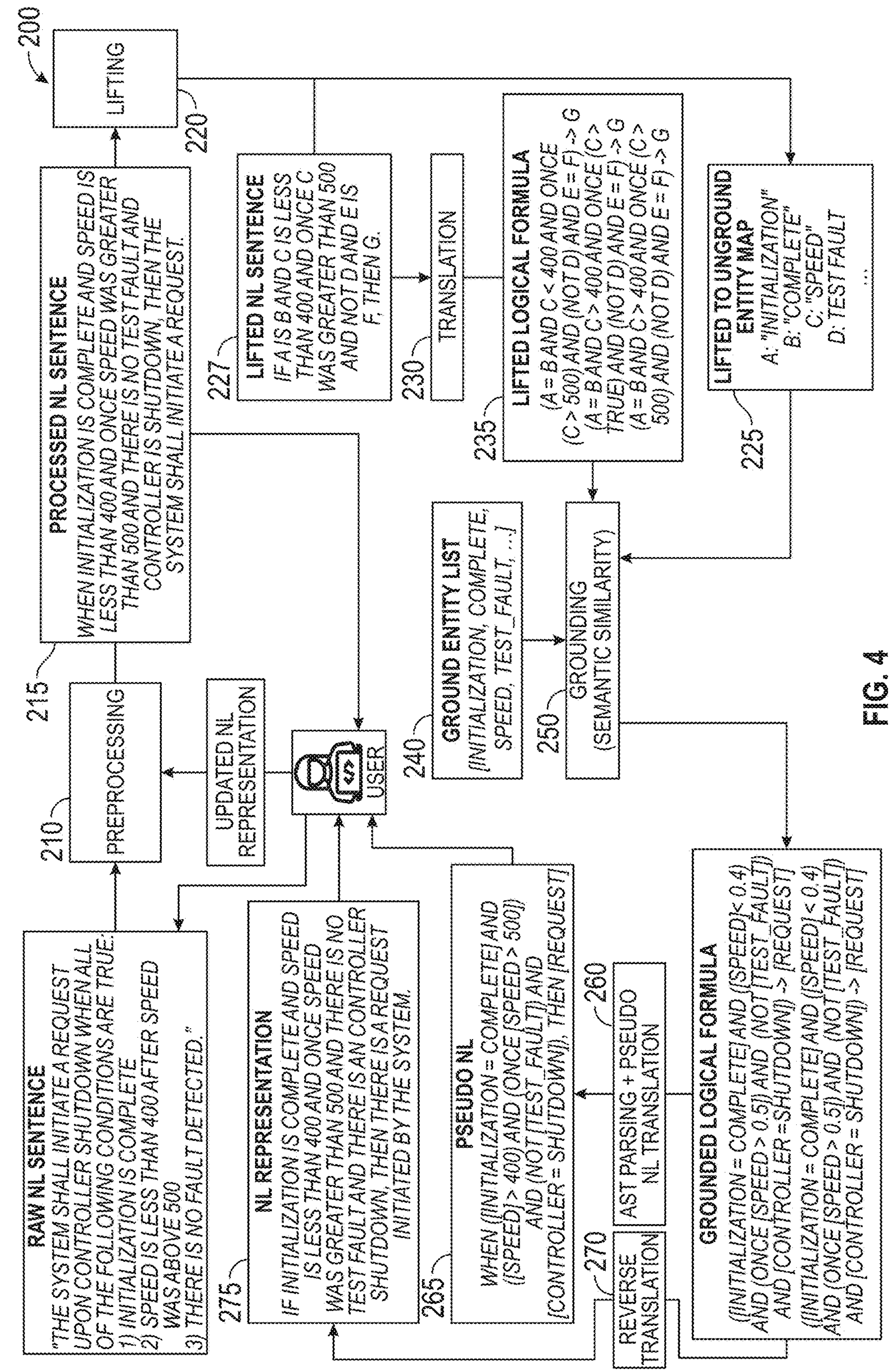
FIG. 4 is another illustrative example of use of the natural language requirement transformation process of FIG. 2, in accordance with an aspect of the present disclosure.

Referring now to FIG. 4, another specific example illustrating the use of process 200 to transform an unstructured aerospace NL requirement to formalism is shown. At block 210, the LLM receives, as an input requirement, the following raw NL sentence from a user:

> The system shall initiate a request upon controller shutdown when all of the following conditions are true:
> 1) Initialization is complete
> 2) Speed is less than 400 after speed was above 500
> 3) There is no fault detected.

The LLM processes the raw NL sentence input at block 210 to omit wordiness and ambiguity from the raw NL sentence provided by the user and outputs the following sentence at block 215:

> When initialization is complete and speed is less than 400 after speed was greater than 500 and there is no test fault and controller is shutdown, then the system shall initiate a request.

The user may be asked by the chatbot if the sentence output at block 215 matches the user's intent. If the output sentence does not match the user's intent, the user may return to the preprocessing stage at block 210 and input a revised NL input requirement that is processed by the LLM to once again remove wordiness and ambiguity. This process may be repeated until the user is satisfied with the revised version of the input NL requirement.

At block 220, lifting is performed where the LLM takes as input the processed NL from block 215 and abstracts away details of the sentence leaving only the underlying sentence structure, which is lifted to an ungrounded entity map at block 225 as follows:

A: 'initialization'
B: 'complete'
C: 'speed'
D: 'test fault'
E: 'controller'
F: 'shutdown'
G: 'request'

This, in turn, leaves the following lifted NL sentence at block 227:

> If A is B and C is less than 400 after C was greater than 500 and not D and E is F, then G.

Once lifting is performed where details not necessary at the level of logical formalization are replaced with atomic entities, translation is performed at block 240 on the lifted NL sentence to a lifted logical formula at block 235, where "Pre" refers to the previous state of variable/expression:

$$(A = B \text{ and } C < 400 \text{ and } (Pre\ (C) > 500) \text{ and } (\text{not } D) \text{ and } E = F) \rightarrow G$$

Grounding is performed at block 250 where the lifted atomic entities are replaced with concrete versions representing concrete concepts to produce a grounded logical formula:

$$([\text{initialization} = \text{complete}]) \text{ and } ([\text{speed}] < 400) \text{ and } (Pre\ ([\text{speed}]) > 500) \text{ and } (\text{NOT } [\text{test\_fault}]) \text{ and } [\text{controller} = \text{shutdown}]) \rightarrow [\text{request}]$$

At blocks 260 and 270, postprocessing occurs where correctness checks are performed on the grounded logical formula from block 250. First, at block 260, the string representation of the grounded logical formula is parsed into an AST representation for syntax checks. Next, at block 270, reverse translation is performed on the AST representation. This converts the structured formalism back to NL such that the user can determine when the underlying formalism generated by process 200 matches the user's intent without the user having to manually process the bare formalism. Block 270 produces a reverse translation of the logical formula generated by the LLM, giving a natural and readable translation (e.g., "If initialization is complete and speed is less than 400 and once speed was greater than 500 and there is no test fault and there is a controller shutdown, then there is a request initiated by the system"). However, since using an LLM for reverse translation does not fully validate the underlying formalism, as described above, a rule-based translation at block 270 to a pseudo-NL that includes parentheses denoting scope (e.g., "When ([initialization=complete] and ([speed]≤400) and (Pre ([speed])>500) and (NOT [test_fault]) and [controller=shutdown]), then [request]") guarantees that the reverse translation semantically matches the underlying formula. To demonstrate the ability of the process 200 to mitigate hallucination in LLMs, consider a lifted logical formula output generated by block 240 as follows: (A=B and C<400 and Pre (C)>true and (not D) and E=F)→G, where "Pre" refers to the previous state of a variable/expression. This formula contains a syntactically incorrect expression "C>true", which can be revealed by constructing an AST. By definition, a greater than ">" operator expects 2 numerical operands, thus the Boolean operand "true" is inappropriate in this context. To identify semantic issues in the formulae generated by LLMs, a review of the rule-based translation can be conducted. For example, if a semantically incorrect expression "C>400" instead of the correct form "C<400" is produced due to hallucination, this issue can be detected through manual inspection of the rule-based translation.

To test the effectiveness of the process 200 illustrated in FIG. 2, a case study was performed involving the formalization of open-source landing gears requirements for an aircraft. In the study, 19 requirements were formalized, referencing a total of 28 ground entities. The target formalism is LTL extended with equality and enumeration types.

A landing gear system of an aircraft is generally composed of three parts: (1) a mechanical part which contains all the mechanical devices including hydraulic parts and three landing sets; (2) a digital part including control software; and (3) a pilot interface. The action to be done at each time depends on the state of all the physical devices composing the system and on their temporal behavior. When considering such systems, the challenge is first to model and to program the software part controlling the landing and the retraction sequence, and second to prove safety requirements taking into account the physical behavior of hydraulic devices. A landing system controls maneuvering of landing gears and associated doors. The system is composed of three landing sets: front, left, and right. Each landing set contains a door, a landing-gear, and associated hydraulic cylinders. The system is controlled digitally and a basic landing sequence generally includes: (1) open the doors of the landing gear boxes; (2) extend the landing gears; and (3) close the doors. Similarly, after taking off, the corresponding basic retraction sequence to be performed includes: (1) open the doors; (2) retract the landing gears; and (3) close the doors.

With respect to the pilot interface, retraction and outgoing of gears is controlled by the pilot via an Up/Down handle. With respect to the mechanical and hydraulic parts, hydraulic power is provided to the hydraulic cylinders from an external hydraulic circuit through a set of electro-valves, each of which is activated by an electrical order coming from the digital part. A set of discrete sensors inform the digital part about the state of the equipment. With respect to the digital part, it is composed of two identical computing modules that execute in parallel the same control software. This control software controls gears and doors, detecting anomalies, and informing the pilot about the global state of the system and anomalies (if any). The software produces commands for the distribution elements of the hydraulic system with respect to the sensors values and the pilot orders. The two computing modules receive the same input (sensor values and pilot orders). From these inputs, each module computes five electrical orders (one for each electro-valve). These corresponding electrical orders outgoing from the two modules are physically produced on the same electrical line. The implicit composition of two outputs is an electrical "OR". Consequently, if the two different computing modules send two different values (true and false) on the same line (for instance in case of failure of one of the two computing modules), then only the true value is transmitted to the corresponding electro-valve.

Similarly, the two modules produce global Boolean state variables to the cockpit (one for each cockpit light). These outputs are synthesized by each module from sensor data and from the situation awareness. Similarly to electrical orders provided to the electro-valves, the Boolean state variables from the two modules are composed following a logical "OR" operation.

The aim of the software part of the landing gear system includes controlling the hydraulic devices according to the pilot orders and to the mechanical devices positions, and monitoring the system to inform the pilot in case of anomaly.

The term "normal mode" refers to any scenario involving no failure of the landing gear system. The term "failure mode" refers to any scenario involving combinations of failures with a probability greater than a predetermined threshold. When the command line is working (normal mode), the landing system reacts to the pilot's orders by actioning or inhibiting the electro-valves of the appropriate cylinders.

Regarding the mechanical and hydraulic equipment, the most likely failures to consider are permanent failures, e.g., each electro-valve can fail and end up blocked either in the closed or in the open state. Regarding the computing modules, each of them can fail in two different ways: (1) permanent failure, in that case the module does not send orders to the electro-valves or the lights; and (2) the computing module behaves erroneously by sending random values to the actuators.

The landing gear system must meet a set of safety requirements. These requirements are divided into two parts: normal mode requirements and failure mode requirements. The process 200 of the present disclosure may be used to formalize NL expressions associated with landing gear system requirements for both the normal mode and the failure mode. By way of illustrative example, the LLM may receive, as an input requirement, the following raw NL sentence associated with a normal mode landing gear system requirement:

When the command line is in normal mode, if the landing gear command handle is DOWN, then eventually the gears will be locked down and the doors will be closed.

The process 200 continues as described above with respect to blocks 210-275 illustrated in each of FIGS. 2-4 to process the foregoing raw NL sentence and output the following formalized landing gear system requirement in response:

When the command line is working, if the landing gear command handle is DOWN, then eventually the gears will be locked down and the doors will be closed.

with the corresponding logical formula:

$$G\,(\text{(command line mode} = \text{NORMAL} \wedge \text{command handle position} = \text{DOWN)} \Rightarrow F\,\text{(gears position} = \text{LOCKED DOWN} \wedge \text{door position} = \text{CLOSED)).}$$

By way of another illustrative example, the LLM may receive, as an input requirement, the following raw NL sentence associated with a failure mode landing gear system requirement:

If one of the three doors is locked in the closed position after stimulating the opening electro-valve, then the output normal mode is set to false.

The process 200 continues as described above with respect to blocks 210-275 illustrated in each of FIGS. 2-4 to process the foregoing raw NL sentence and output the following formalized landing gear system requirement in response:

If one of the three doors is still seen locked in the closed position more than 7 s after stimulating the opening electro-valve, then the red light "landing gear system failure" is on By way of yet another illustrative example, the LLM may receive, as an input requirement, the following raw NL sentence associate with a normal mode landing gear system requirement:

When the command line is in normal mode, if the landing gear command handle is UP, then eventually the gears will be locked retracted and the doors will be closed.

The process 200 continues as described above with respect to blocks 210-275 illustrated in each of FIGS. 2-4 to process the foregoing raw NL sentence and output the following formalized landing gear system requirement in response:

When the command line is working, if the landing gear command handle has been pushed UP and stays UP, then the gears will be locked retracted and the doors will be seen closed less than 15 s after the handle has been pushed.

The formalized landing gear system requirements generated by the process 200 in the foregoing examples are implemented in the control software of the landing gear system for controlling gears and doors, detecting anomalies, and informing the pilot about the global state of the landing gear system and any anomalies.

Figure 5:
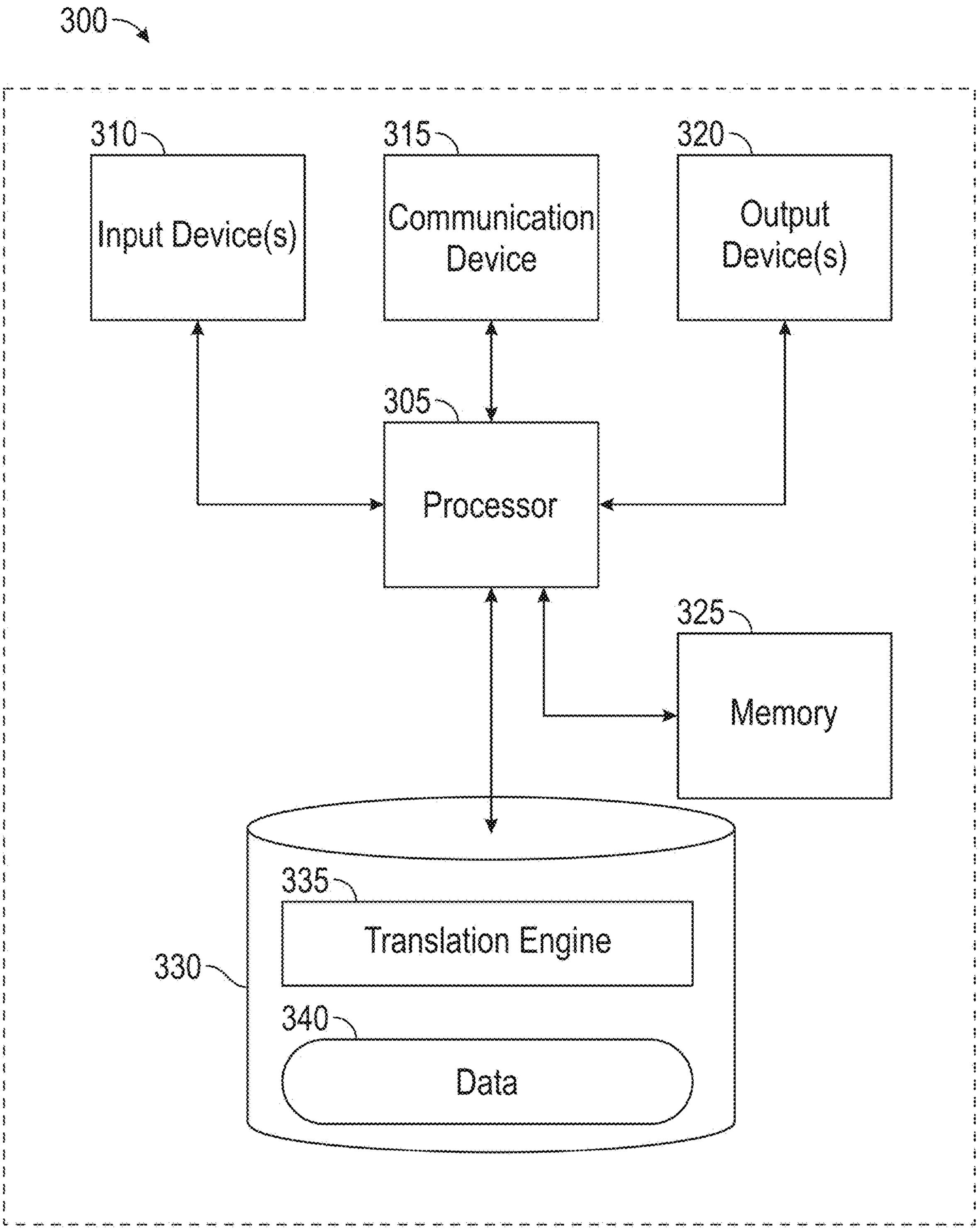
FIG. 5 is an illustrative depiction of a block diagram of a system configured to support processes disclosed herein, in accordance with aspects of the present disclosure.

Referring now to FIG. 5, a computing device 300 configured for use within system 100 to perform any one or more of the processes described herein, including but not limited to aspects disclosed in FIGS. 1-4. Computing device 300 includes a processor 305 operatively coupled to a communication device 315 to communicate with other systems, a data storage device 330, one or more input devices 310 to receive inputs from other systems and entities, one or more output devices 320, and a memory 325. Communication device 315 may facilitate communication with other systems and components, such as other devices, a communications network, and a server. Input device(s) 310 may include, for example, a keyboard, a keypad, a mouse or other pointing device, a microphone, knob or a switch, an infrared (IR) port, a docking station, and/or a touch screen. Input device(s) 310 may be used, for example, to enter information into computing device 300 such as a natural language expression. Output device(s) 320 may comprise, for example, a display (e.g., a display screen) a speaker, and/or a printer.

Data storage device 330 may include any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory.

Translation engine 335 and data 340 may include program instructions executed by processor 305 to cause computing device 300 to perform any one or more of the processes described herein, including but not limited to aspects disclosed in FIGS. 1-4.

Data 340 (either cached or a full database) may be stored in volatile memory such as memory 325. Data storage device 330 may also store data and other program code for providing additional functionality and/or which are necessary for operation of computing device 300, such as device drivers, operating system files, etc.

Formalism enables rigorous verification and validation of systems, ensuring that they meet their intended requirements and behave as expected. However, formal analysis requires a formal representation of the system being analyzed, which is a barrier to entities that do not employ experts in formal methods. To make formalism more approachable and actionable, the present disclosure provides an LLM-based approach to interactively translate unstructured natural language to formalism. The LLM-based approach of the present disclosure employs a usable, purely natural language-based interface that provides high assurance for translation correctness while still being approachable for non-experts in formal methods.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an aspect," "in aspects," "in various aspects," "in some aspects," or "in other aspects" may each refer to one or more of the same or different aspects in accordance with this disclosure.

Further aspects of the present disclosure are provided by the subject matter of the following clauses.

A system for using an LLM to convert NL requirements for aerospace systems to formalism includes a processor and a memory including instructions which, when executed by the processor, cause the system at least to perform: receiving, as user input at the processor, a NL expression associated with a requirement for a landing gear system of an aircraft; using an LLM to revise the NL expression to remove words that are determined by the LLM to be unnecessary to the NL expression; using the LLM to replace at least one word in the revised NL expression with a lifted atomic entity to generate an underlying sentence structure of the revised NL expression; using the LLM to translate the underlying sentence structure to a lifted logical formula; using the LLM to ground the lifted logical formula by replacing each lifted atomic entity with a core concept such that multiple references to the same core concept are mapped to the same grounded atomic entity; parsing the grounded logical formula into an AST representation for syntax checking; translating the grounded logical formula into a pseudo-NL expression to semantically match the grounded logical formula; using the LLM to convert the NL expression into a formalized requirement for the landing gear system of the aircraft based at least in part on the pseudo-NL expression; and controlling the landing gear system of the aircraft based on the formalized requirement.

The system according to the preceding clause, wherein the instructions, when executed by the processor, further cause the system at least to perform generating an unground entity map that associates each lifted atomic entity to the at least one word replaced by the lifted atomic entity using a value; and generating at least one ground entity representing a core concept associated with the NL expression.

The system according to any preceding clause, wherein using the LLM to ground the lifted logical formula includes retrieving phrase embeddings for each lifted atomic entity of the unground entity map and for each ground entity, associating each lifted atomic entity of the unground entity map with a most similar ground entity by computing a cosine similarity between the associated phrase embeddings of the lifted atomic entity and the ground entity, and selecting the ground entity with a highest cosine similarity. In aspects of the present disclosure, the ground entities may be authored by aerospace requirements engineers, which ensures that requirements are strongly co-related with concepts primarily emanating from the aerospace domain.

The system according to any preceding clause, wherein using the LLM to replace the at least one word in the revised NL expression with the lifted atomic entity includes providing in-context learning to the LLM.

The system according to any preceding clause, wherein using the LLM to translate the underlying sentence structure to a lifted logical formula includes providing in-context learning to the LLM.

The system according to any preceding clause, wherein the instructions, when executed by the processor, further cause the system at least to perform priming the LLM prior to using the LLM to revise the NL expression by providing a textual description of initial relevant context and knowledge.

The system according to any preceding clause, wherein the instructions, when executed by the processor, further cause the system at least to perform receiving, as user input at the processor, an instruction for the LLM to review the translation of the grounded logical formula for mistakes in response to failure of parsing of the grounded logical formula into the AST representation.

The system according to any preceding clause, wherein using the LLM to translate the underlying sentence structure to the lifted logical formula includes translating the underlying sentence structure to temporal logic (e.g., linear temporal logic, signal temporal logic). In aspects of the present disclosure, the lifting process may also utilize fine-tuned LLMs to train on aerospace named-entities found in aerospace system requirements, in addition to in-context learning.

The system according to any preceding clause, wherein the NL expression is a NL requirement for an aerospace system.

A processor-implemented method for using a LLM to convert NL requirements for aerospace systems to formalism includes: receiving, as user input, a NL expression associated with a requirement for a landing gear system of an aircraft; using an LLM to revise the NL expression to remove words that are determined by the LLM to be unnecessary to the NL expression; using the LLM to replace at least one word in the revised NL expression with a lifted atomic entity to generate an underlying sentence structure of the revised NL expression; using the LLM to translate the underlying sentence structure to a lifted logical formula; using the LLM to ground the lifted logical formula by replacing each lifted atomic entity with a core concept such that multiple references to the same core concept are mapped to the same grounded atomic entity; parsing the grounded logical formula into an AST representation; using the LLM to convert the NL expression into a formalized requirement for the landing gear system of the aircraft based at least in part on the grounded logical formula; and controlling the landing gear system of the aircraft based on the formalized requirement.

The processor-implemented method according to any preceding clause, further comprising translating the grounded logical formula into a pseudo-NL expression to semantically match the grounded logical formula.

The processor-implemented method according to any preceding clause, further comprising generating an unground entity map that associates each lifted atomic entity to the at least one word replaced by the lifted atomic entity using a value, and generating at least one ground entity representing a core concept associated with the NL expression.

The processor-implemented method according to any preceding clause, wherein using the LLM to ground the lifted logical formula includes retrieving phrase embeddings for each lifted atomic entity of the unground entity map and for each ground entity, associating each lifted atomic entity of the unground entity map with a most similar ground entity by computing a cosine similarity between the associated phrase embeddings of the lifted atomic entity and the ground entity, and selecting the ground entity with a highest cosine similarity.

The processor-implemented method according to any preceding clause, wherein using the LLM to replace the at least one word in the revised NL expression with the lifted atomic entity includes providing in-context learning to the LLM.

The processor-implemented method according to any preceding clause, wherein using the LLM to translate the underlying sentence structure to a lifted logical formula includes providing in-context learning to the LLM.

The processor-implemented method according to any preceding clause, further comprising priming the LLM prior to using the LLM to revise the NL expression by providing a textual description of initial relevant context and knowledge.

A non-transitory computer-readable storage medium in which is stored instructions for causing a processor to execute a processor-implemented method for using a LLM to convert NL requirements for aerospace systems to formalism includes: receiving, as user input at the processor, a NL expression associated with an aerospace system; using an LLM to revise the NL expression to remove words that are determined by the LLM to be unnecessary to the NL expression; using the LLM to replace at least one word in the revised NL expression with a lifted atomic entity to generate an underlying sentence structure of the revised NL expression; using the LLM to translate the underlying sentence structure to a lifted logical formula; using the LLM to ground the lifted logical formula by replacing each lifted atomic entity with a core concept such that multiple references to the same core concept are mapped to the same grounded atomic entity; using the LLM to convert the NL expression into a formalized requirement for the aerospace system based at least in part on the grounded logical formula; and controlling the aerospace system based on the formalized requirement.

The non-transitory computer-readable storage medium according to any preceding clause, wherein the aerospace system is a landing gear system of an aircraft.

The non-transitory computer-readable storage medium according to any preceding clause, wherein the method further comprises parsing the grounded logical formula into an AST representation, and using the LLM to reverse translate the AST representation into a NL representation of the grounded logical formula.

The non-transitory computer-readable storage medium according to any preceding clause, wherein the method further comprises translating the grounded logical formula into a pseudo-NL expression to semantically match the reverse translation to the grounded logical formula.

What is claimed is:

1. A system for using large language models (LLMs) to convert natural language (NL) requirements for aerospace systems to formalism, the system comprising:

a processor; and a memory including instructions which, when executed by the processor, cause the system at least to perform:

receiving, as user input at the processor, a NL expression associated with a requirement for a landing gear system of an aircraft;

using an LLM to:

revise the NL expression to remove words that are determined by the LLM to be unnecessary to the NL expression;

replace at least one word in the revised NL expression with a lifted atomic entity to generate an underlying sentence structure of the revised NL expression;

translate the underlying sentence structure to a lifted logical formula; and ground the lifted logical formula by replacing each lifted atomic entity with a core concept such that multiple references to the same core concept are mapped to the same grounded atomic entity;

parsing the grounded logical formula into an abstract syntax tree (AST) representation for syntax checking;

translating the grounded logical formula into a pseudo-NL expression to semantically match the grounded logical formula;

using the LLM to convert the NL expression into a formalized requirement for the landing gear system of the aircraft based at least in part on the pseudo-NL expression; and controlling the landing gear system of the aircraft based on the formalized requirement.

2. The system according to claim 1, wherein the instructions, when executed by the processor, further cause the system at least to perform:

generating an unground entity map that associates each lifted atomic entity to the at least one word replaced by the lifted atomic entity using a value; and generating at least one ground entity representing a core concept associated with the NL expression.

3. The system according to claim 2, wherein using the LLM to ground the lifted logical formula includes:

retrieving phrase embeddings for each lifted atomic entity of the unground entity map and for each ground entity;

associating each lifted atomic entity of the unground entity map with a most similar ground entity by computing a highest cosine similarity between the associated phrase embeddings of the lifted atomic entity and the ground entity; and selecting the ground entity with a highest cosine similarity.

4. The system according to claim 1, wherein using the LLM to replace the at least one word in the revised NL expression with the lifted atomic entity includes providing in-context learning to the LLM.

5. The system according to claim 1, wherein using the LLM to translate the underlying sentence structure to a lifted logical formula includes providing in-context learning to the LLM.

6. The system according to claim 1, wherein the instructions, when executed by the processor, further cause the system at least to perform priming the LLM prior to using the LLM to revise the NL expression by providing a textual description of initial relevant context and knowledge.

7. The system according to claim 1, wherein the instructions, when executed by the processor, further cause the system at least to perform receiving, as user input at the processor, an instruction for the LLM to review the translation of the grounded logical formula for mistakes in response to failure of parsing of the grounded logical formula into the AST representation.

8. The system according to claim 1, wherein using the LLM to translate the underlying sentence structure to the lifted logical formula includes translating the underlying sentence structure to temporal logic.

9. The system according to claim 1, wherein the NL expression is an NL requirement for an aerospace system.

10. A processor-implemented method for using a large language model (LLM) to convert natural language (NL) requirements for aerospace systems to formalism, the method comprising:

receiving, as user input, an NL expression associated with a requirement for a landing gear system of an aircraft;

using an LLM to:

revise the NL expression to remove words that are determined by the LLM to be unnecessary to the NL expression;

replace at least one word in the revised NL expression with a lifted atomic entity to generate an underlying sentence structure of the revised NL expression;

translate the underlying sentence structure to a lifted logical formula; and ground the lifted logical formula by replacing each lifted atomic entity with a core concept such that multiple references to the same core concept are mapped to the same grounded atomic entity;

parsing the grounded logical formula into an abstract syntax tree (AST) representation;

using the LLM to convert the NL expression into a formalized requirement for the landing gear system of the aircraft based at least in part on the grounded logical formula; and controlling the landing gear system of the aircraft based on the formalized requirement.

11. The processor-implemented method according to claim 10, further comprising translating the grounded logical formula into a pseudo-NL expression to semantically match the grounded logical formula.

12. The processor-implemented method according to claim 10, further comprising:

generating an unground entity map that associates each lifted atomic entity to the at least one word replaced by the lifted atomic entity using a value; and generating at least one ground entity representing a core concept associated with the NL expression.

13. The processor-implemented method according to claim 12, wherein using the LLM to ground the lifted logical formula includes:

retrieving phrase embeddings for each lifted atomic entity of the unground entity map and for each ground entity;

associating each lifted atomic entity of the unground entity map with a most similar ground entity by computing a cosine similarity between the associated phrase embeddings of the lifted atomic entity and the ground entity; and selecting the ground entity with a highest cosine similarity.

14. The processor-implemented method according to claim 10, wherein using the LLM to replace the at least one word in the revised NL expression with the lifted atomic entity includes providing in-context learning to the LLM.

15. The processor-implemented method according to claim 10, wherein using the LLM to translate the underlying sentence structure to a lifted logical formula includes providing in-context learning to the LLM.

16. The processor-implemented method according to claim 10, further comprising priming the LLM prior to using the LLM to revise the NL expression by providing a textual description of initial relevant context and knowledge.

17. A non-transitory computer-readable storage medium in which is stored instructions for causing a processor to execute a processor-implemented method for using a large language model (LLM) to convert natural language (NL) requirements for aerospace systems to formalism, the method comprising:

receiving, as user input at the processor, an NL expression associated with a requirement for an aerospace system;

using an LLM to:

revise the NL expression to remove words that are determined by the LLM to be unnecessary to the NL expression;

replace at least one word in the revised NL expression with a lifted atomic entity to generate an underlying sentence structure of the revised NL expression;

translate the underlying sentence structure to a lifted logical formula; and ground the lifted logical formula by replacing each lifted atomic entity with a core concept such that multiple references to the same core concept are mapped to the same grounded atomic entity;

parsing the grounded logical formula into an abstract syntax tree (AST) representation;

using the LLM to reverse translate the AST representation into a NL representation of the grounded logical formula and to convert the NL expression into a formalized requirement for the aerospace system based at least in part on the grounded logical formula; and controlling the aerospace system based on the formalized requirement.

18. The non-transitory computer-readable storage medium according to claim 17, wherein the aerospace system is a landing gear system of an aircraft.

19. The non-transitory computer-readable storage medium according to claim 17, wherein the method further comprises translating the grounded logical formula into a pseudo-NL expression to semantically match the reverse translation to the grounded logical formula.

* * * * *